(12) United States Patent
Wyatt

(10) Patent No.: US 7,890,748 B1
(45) Date of Patent: Feb. 15, 2011

(54) SYSTEM AND METHOD FOR HIPAA COMPLIANT COMMUNICATION

(76) Inventor: Eric Wyatt, 5196 S. Yale Ave., Tulsa, OK (US) 74135

( * ) Notice: Subject to any disclaimer, the term of this patent is extended or adjusted under 35 U.S.C. 154(b) by 1045 days.

(21) Appl. No.: 11/395,349

(22) Filed: Mar. 31, 2006

(51) Int. Cl.
*H04L 29/06* (2006.01)
(52) U.S. Cl. .................. 713/151; 713/150; 713/152
(58) Field of Classification Search .......... 713/151, 713/150, 152
See application file for complete search history.

(56) References Cited

PUBLICATIONS

David Kibbe, MD, 10 Steps to HIPAA Security Compliance, Family Practice Management, Apr. 2005.*
Brumbach, VPNs and Public Key Infrastructure, Published by O'Reilly, year 2004, Sep. 23.*
GBA Health Network Systems, HIPAA 2005 Security Rule, The 54 wasys to Compliance, printed out in year 2009.*
Domain Secure Channel Utility—Nltest.exe, printed out year 2010.*
Velocity Networks Private Network Service, printed out year 2010.*
Professional Domain Names—How It Works, printed out year 2010.*
HIPAA's Effect on Web Site Privacy Policies; Annie I. Anton; Julia B. Eart; Matthew W. Vail; Neha Jain; Carrie M. Gheen; Jack M. Frink; Security & Privacy, IEEE; vol. 5 , Issue: 1; Publication Year: 2007 , pp. 45-52.*
Aligning Requirements with HIPAA in the iTrust System; Massey, A.K.; Otto, P.N.; Anton, A.I.; International Requirements Engineering, 2008. RE '08. 16th IEE; Publication Year: 2008 , pp. 335-336.*
A Cryptographic Key Management Solution for HIPAA Privacy/ Security Regulations; Wei-Bin Lee; Chien-Ding Lee; Information Technology in Biomedicine, IEEE Transactions on; vol. 12 , Issue: 1; Publication Year: 2008 , pp. 34-41.*

* cited by examiner

*Primary Examiner*—David Y Jung
(74) *Attorney, Agent, or Firm*—Gable Gotwals

(57) ABSTRACT

The present invention is a system and method for subscribers to communicate electronically over the internet while meeting HIPAA confidentiality requirements. It entails establishing a secure virtual private network (VPN) or higher level domain and enrolling subscribers. Communications sent between subscribers via the VPN or domain have confidential information attached. Unsecured notifications can be sent to the receiving subscriber directing them to log on to the VPN or domain to retrieve the secured message.

16 Claims, 2 Drawing Sheets

SYSTEM AND METHOD FOR HIPAA COMPLIANT COMMUNICATION

REFERENCE TO PENDING APPLICATIONS

This application is not based upon any pending domestic or international patent applications.

REFERENCE TO MICROFICHE APPENDIX

This application is not referenced in any microfiche appendix.

FIELD OF THE INVENTION

The present invention is generally directed toward a system and method to allow for the secure transfer of medical related data. More specifically the present invention provides a system and method to allow for HIPAA compliant communication via the Internet.

BACKGROUND OF THE INVENTION

The confidentiality use and transfer of patient medical records as well as personal and insurance information has long been a concern of the medical community. With the advances in electronic communication and data storage these issues have continued to be the source of great concern. In 1996, U.S. Congress passed the Health Insurance Portability and Accountability Act, also known as HIPAA. Among other things, HIPAA sets out strict requirements for certain covered entities for the control and transmittal of patient's electronic medical data. The covered entities include dentists, doctors, hospitals, insurance companies, dental labs and medical labs. The transfer of this information on an open network is required by HIPAA to be encrypted. If the data is not encrypted during transmission, then the data must be transferred on a closed and secured system or network.

Modern medical practices, especially dental practices, are highly automated offices. Most new dental practices maintain all of their patient information on a computer database. The information ranges from the individual's name, home address, phone numbers, social security number and insurance policy as well as the intra oral photographs and X-rays taken during examination and examination notes. Were it not for the security requirements of HIPAA, this information could be readily transferred from one provider to an insurance company or dental lab as an attachment to an ordinary e-mail. When sending an e-mail via the Internet the sender has no control over the path which the message takes. The message and its attachments can be broken up into one or more packets and then sent over any one of a near infinite number of paths between the sender and the recipient. While in route, the message can be intercepted and opened. The information contained therein can be duplicated and the e-mail or message continued or put back in place and continued on its way to the recipient with neither the sender nor recipient knowing the transmission has been intercepted.

The sender can ensure the confidentiality of the contents of a message sent over the Internet via e-mail by the use of encryption. However the use of encryption on a ordinary Internet e-mail is cumbersome and can complicate the recipient's opening and use of the data including corruption of attached files.

In referring a patient to another care provider or filing an insurance claim for services provided to a patient, as well as sending information to a lab to have work done for a patient, HIPAA requires the sending as well as the receipt of the patient information be an authenticated source. While it is possible to send this information between two points on an authenticated basis without it having a larger network in place, it becomes prohibitive based on the amount of time and effort that is needed to set up an authenticated system between two individual parties. This solution becomes even more unworkable when considering that any care provider must exchange information with a number of insurance companies as well as multiple labs and specialized care providers. These same problems arise when trying to solve this problem through the use of dedicated networks or lines. What is needed is a system and method to provide secure electronic communication between care providers, labs, insurance companies and hospitals for communication and data transfers containing confidential patient information.

BRIEF SUMMARY OF THE INVENTION

It is an object of the present invention to provide a system and method which allows for HIPAA compliant communication between care providers, insurance companies, labs, hospital and other medical institutions for communicating over the Internet. These communications contain sensitive patient information and data. It is a further object of the present invention to provide a scalable network. It is yet another object of the present invention to provide tools for the quick and efficient notification of a referral along with necessary information patient personal, insurance and medical information.

The present invention is a virtual private network otherwise known as a VPN which is operated by an independent third party on the Internet. Individual medical, dental practices, laboratories, insurance companies, hospitals and other medical institutions can purchase a subscription to the VPN. The subscribers to the VPN are assigned an authentication, such as an account, and password. Authentication can also be accomplished by confirmation of hardware or software located on the subscriber's computer.

When one of the subscribers desires to send information subject to HIPAA security requirements to another subscriber, the sending subscriber logs on to the VPN. The message containing the confidential patient information can then be sent in a secure manner via an e-mail sent within the VPN. The sender can log out of the VPN at any time after the communication has been sent. The communication is then received in an e-mail account within the VPN. The recipient subscriber can then log on to the VPN using their authentication and retrieve the information. A notification communication can also be sent to the recipient subscriber telling them to check for a secure message on the VPN. The unsecured notification could be an e-mail, voicemail or any other type of communication known in the art.

A continuous VPN could also be used for the present invention. This configuration would have the subscriber's connection to the unsecured internet going through the VPN's firewall. It would also eliminate the logging on to and out of the VPN. Every time the subscriber turned on their computer it would log on to the VPN.

The present invention can also be implemented using a secure higher level domain such as a .dds or .med in place of .com, .net, .org and other higher level domains commonly used today. The use of the higher level domain would be in lieu of using a VPN.

The present invention also includes a secure online referral tool. If one subscriber refers a patient to another subscriber, a secure communication can be sent from the referring subscriber to the subscriber receiving the referral. The communication would contain a general description of the referral. The patient's personal information, insurance, medical history, x-rays and other pertinent information would then be attached and sent with the referral notification.

A better understanding of the invention will be obtained from the following detailed description of the preferred embodiments taken in conjunction with the drawings and the attached claims.

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Figure 1:
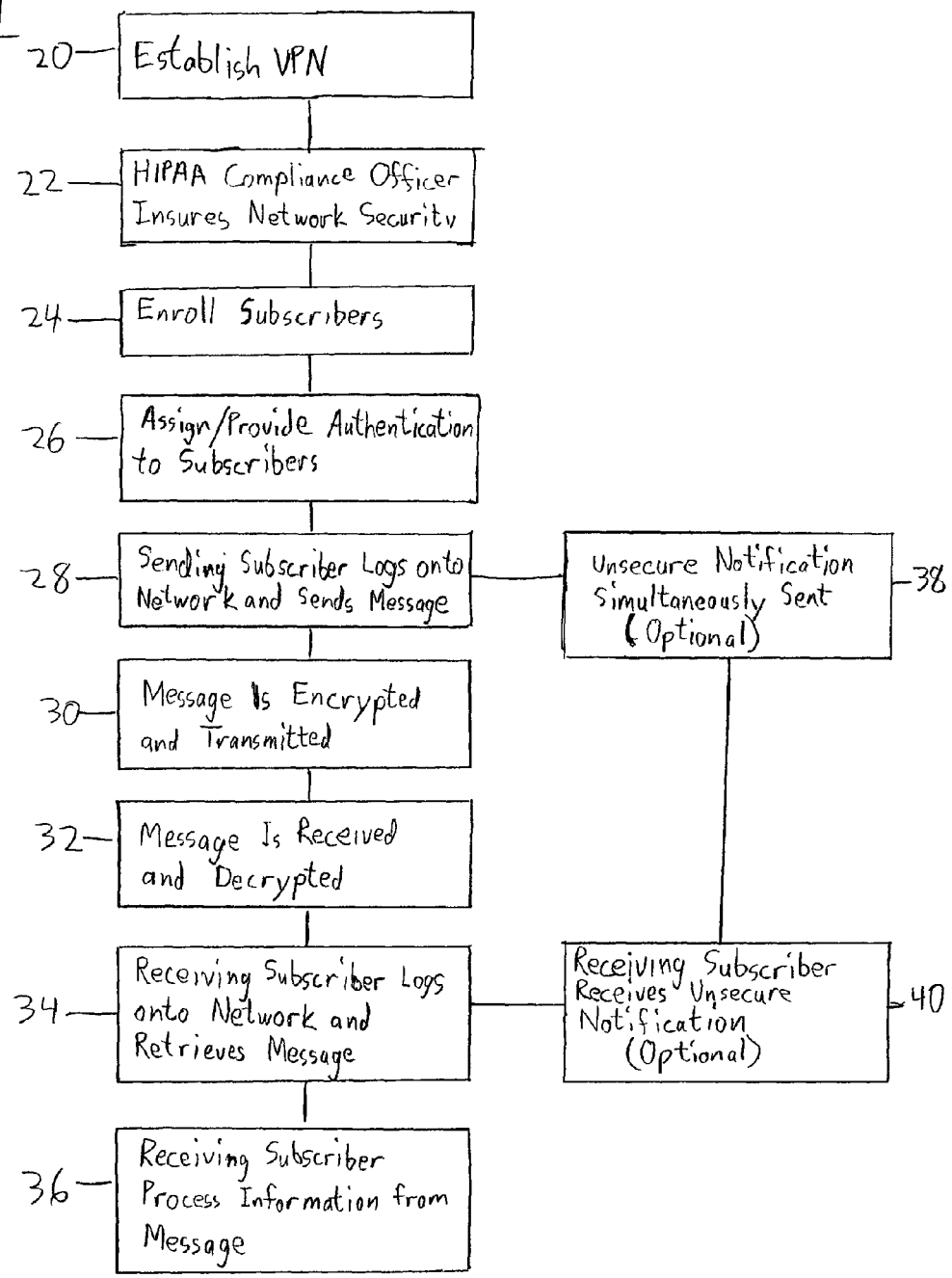
FIG. 1 is a flow chart illustrating the general steps of the present invention.

Referring now to FIG. 1 which shows a flowchart of the general steps in the process of the present invention. An entity establishes a virtual private network 20 commonly known as a VPN. This allows for secured communication between two parties over an otherwise unsecured Internet connection. There are various forms of VPNs which are well known in the field and operate using various security features, such as account and password protection. Security of the VPN can be based upon a number of encryption methods including but not limited to symmetric key encryption and public key encryption. Likewise VPN security can be accomplished by use of Internet Security Protocol often referred to as IPSec. Within IPSec based VPNs, encryption can be accomplished by two modes, tunnel and/or transport. A third type of security that could be used is through the use of an Authentication Authorization and Accounting server commonly referred to as an AAA server. While various methods of securing a VPN are listed herein, it is understood that other methods of securing a VPN are known in the art and can be used under the present invention.

With the VPN established, a HIPAA Compliance Officer then ensures the security of the VPN 22 on an ongoing basis. The HIPAA Compliance Officer helps enroll subscribers 24 insuring that the subscribers have suitable systems in place to help maintain the security of the VPN so subscribers are not exposed to possible breaches in the security. Although not required it is anticipated that at least some subscribers would pay a periodic subscription fee to the entity operating the VPN.

During the enrollment process 24 the new subscriber is assigned and provided an authentication means 26. The authentication means 26 could include but is not limited to the assignment of an account and password or the recording of some biometric parameters such as fingerprint or retinal scan. Likewise software or an electronic hardware device located on the subscriber's computer could provide a key to be used for authenticating the identity of the subscriber when logging on.

For sending secure and HIPAA compliant communication via the VPN, a first subscriber logs onto the network and enters and sends a message 28. This message and any attachments are encrypted prior to transmittal 30. The encrypted transmitted message is then received by the intended second subscriber and decrypted 32. The second subscriber then logs onto the network and retrieves the message 34. The information contained in the message is then processed or otherwise used by the second subscriber 36.

For certain subscribers who continually be send and receive secure messages such as care providers, insurance companies, laboratories, hospitals and the like, a continuous VPN connection could be used. They would be logged on to the VPN every time they turned on their computer. If these subscribers accessed the unsecured internet the access would be through the VPN's firewall.

It is anticipated that some subscribers may not be regular users of the VPN. As such, they may not regularly check for secure messages from other subscribers. For those subscribers, an unsecured notification can be sent simultaneously 38 at the same time the first subscriber sends the secure message within the VPN 28. The unsecured notification would typically be sent via the Internet as an unsecured e-mail, although other methods of sending communication between two parties could also be used while still falling within the scope of this invention. The unsecured message is preferably automatically sent by either the VPN or the subscriber sending the secured message. The unsecured message would also preferably be sent when the secured message is sent, encrypted, decrypted or received. The second subscriber then receives this unsecured notification 40 alerting the second subscriber to log in to the VPN in order to retrieve a secured message.

It is anticipated various care providers including dental and medical practitioners would be subscribers as well as hospitals, medical and dental insurance companies, medical labs, and dental labs. The present invention would greatly enhance these individual and institutions ability to exchange information. The information could range from radiographs, X-rays, photos, medical and dental transcripts of treatment, billing and payment information as well as basic client information or any other information which is subject to the confidentiality restrictions of HIPAA.

A secure referral notice could also be sent from first subscriber to a second subscriber. The referral notice would contain a brief message identifying the patient and matter for referral such as braces, root canal, joint replacement, etc. The patient's basic personal information, insurance information, medical history, x-rays and the like could then be manually or automatically attached to the referral notice.

This information would be particularly handy in resolving billing issues as well as sharing of vital information in referring patients to specialists, such as a dentist referring a patient to an orthodontist or a general medical practitioner referring a patient to a dermatologist, orthopedic surgeon or any other medical specialist.

Beyond using the present invention to communicate amongst the medical community and other medical institutions, it could be used to communicate sensitive information with patients. If information is to be sent to a patient, each practitioner or institution would register their patient as subscribers to the VPN. This would allow for convenient and efficient electronic communications with the patient while also meeting the HIPAA requirements. Although it may be used in communicating with other types of subscribers, in communicating with a patient it would be particularly important to use the unsecured notification to alert the patient they have received a secured communication from the doctor, hospital, insurance company or other medical institution via the VPN.

Figure 2:
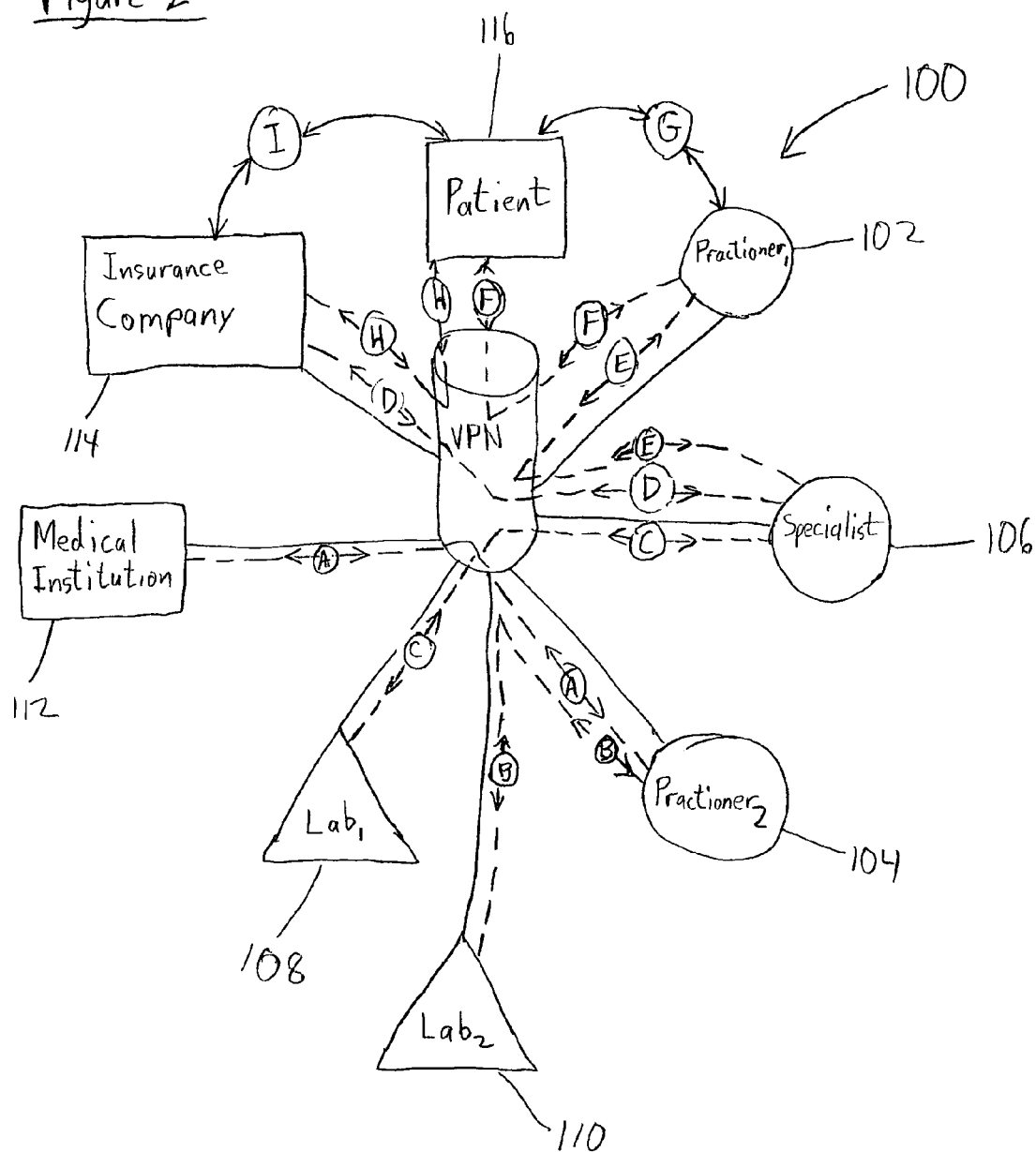
FIG. 2 is a schematic diagram showing one embodiment of the system of the present invention.

Looking now to FIG. 2, the VPN 100 of the present invention can be made up of a plurality of subscribers. For purposes of illustration, the VPN 100 shows practitioners 102 and 104. These practitioners could be medical practitioners, dentists or any other type of care provider. Also shown in FIG. 2 is a specialist 106. The specialist 106 could be a orthopedic surgeon, dermatologist, orthodontist, oral surgeon or any other type of medical or dental specialists. Also shown in FIG. 2 are a first and second lab 108 and 110. These labs could be any type of medical, dental or other lab which is subject to HIPAA confidentiality requirements. The VPN in FIG. 2 also shows a medical institution 112 and an insurance company 114. The medical institution 112 might typically be a hospital. Secured communications sent between the various subscribers shown in FIG. 2 are illustrated by dashed lines with the letters A, B, C, D, E, F and H. Unsecured notifications sent simultaneously to notify subscribers of a secure communication are illustrated by solid lines. The notification messages are indicated as G and I.

Secure communication A is shown in FIG. 2 as going between practitioner$_2$ 104 and a medical institution 112. This type of communication could be a patient's background and medical records needed for treatment of the patient at the medical institution. Likewise, it could be any other number of different types of information subject to HIPAA compliance.

Secured communication B is shown in between practitioner$_2$ 104 and laboratory$_2$ 110. This type of communication could be requests by the practitioner for various laboratory tests on a patient. The return communications might be the results of the laboratory tests. Secured communication C shows a similar type of communication between the specialist 106 and the laboratory) 108.

Secured communication D is shown between the specialist 106 and the insurance company 114. This type of communication could be authorization by the insurance company 114 to the specialist 106 to proceed with a requested treatment. Likewise, it could be the payments of fees by the insurance company 114 to the specialist 106 for services rendered to a patient.

Secured communication E is a referral notice shown between practitioner$_1$ 102 and specialist 106. This might be the transfer of patient information to support the treatment by the specialist of a patient referred by the practitioner$_1$ 102. Such information typically includes examination and medical transcripts, X-rays, intra oral pictures, etc. This type of information could also extend to include patient information, such as name, address, next of kin, social security number, etc. Transmittal of this type of information would prevent the patient from having to fill out additional paperwork as a new patient of the specialist 106.

Secured communication F is shown between practitioner$_1$ 102 and patient 116. This type of communication could include, but is not limited to, test results, recommended treatment plan or even request for payment of services provided. In conjunction with secured communication F, an unsecured notification communication G was sent from the practitioner to the patient. It is anticipated that a patient 116 would typically not be regularly logging on to the VPN 100. As such, in many instances it may be necessary to send an unsecured notification to the patient 116 such as an e-mail to let the patient know that a secure communication from the practitioner 102 is awaiting them on the VPN 100.

Secured communication H is shown between the insurance company 114 and the patient 116. Typically this may be a communication aimed at resolving payment for covered services. Likewise it could be insurance companies acknowledgement of payment or refusal to pay for certain services. Unsecured communication I is also shown between the insurance company 114 and the patient 116. The purpose of the unsecured communication I is to notify the patient or perhaps the insurance company that a secure message awaits them on the VPN 100.

In attempting to describe the various types of secured and unsecured communications between the various subscribers 102 through 116 as shown in FIG. 2 it should be understood that during the treatment of any given patient 116, the type of subscribers shown in FIG. 2 must communicate securely many times with one another on numerous topics subject to HIPAA requirements. As such the descriptions of possible types of communications are provided for illustrative purposes only and should not be interpreted as limitations on the present invention. In reviewing the present invention as described in FIG. 2, it should be understood that any of the subscribers shown 102 through 116 could be composed of a single computer or a local area network, commonly referred to as a LAN made up of a plurality of computers, servers and routers.

In addition to practicing the present invention as described in FIG. 2, it is also possible that the present invention could be employed by using a new higher level domain, such as .dds or .med. Use of a higher level domain would be in lieu of using a VPN. Such an implementation of the present invention would have the .dds or .med or other extensions take the place of a .com, .biz, .net or other higher level domain extension. Such implementation of the present invention would have an entity to operate in a means very similar to how the Internet Corporation for Assignment Names and Numbers commonly referred to as ICANN issues out other domain names.

If a higher level domain is used to implement the present invention the HIPAA Compliance Officer would take measures to ensure the proper HIPAA security measures are met over the domain. Subscribers would have to provide some form of authentication before logging onto the domain. Authentication can be accomplished by means well known in the art including but not limited to account and password, biometric confirmation such as finger print or retinal scan, or confirmation of hardware or software on the subscriber's computer.

One of the biggest advantages of using a higher level domain in place of a VPN is the additional scalability the higher level domain provides. While VPNs can be constructed to handle an extremely large number of subscribers, there are some cost benefit tradeoffs which must be dealt with. Whereas use of a secure higher level domain can support a near infinite number of subscribers.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method for securely exchanging medical records comprising:
   establishing a virtual private network having at least two of personal computers interconnected via the internet, each personal computer having a central processor, a display means, a keyboard and a mouse;
   providing a HIPAA compliance officer;

said compliance officer maintaining a security level of said virtual private network sufficient to meet HIPAA requirements;

enrolling a first subscriber and a second subscriber;

providing each of said subscribers with an individual authentication to log onto said network;

said first and second subscriber logging into said virtual private network;

said first subscriber sending a secured message to said second subscriber via virtual private network, wherein the message is encrypted;

said second subscriber receives and decrypts said secured message; and wherein sending the secure message automatically actives sending an electric unsecured notification message via the internet to said second subscriber.

2. The method of claim 1, said first subscriber comprising a local area network.

3. The method of claim 1, said second subscriber comprising a local area network.

4. The method of claim 1, said enrollment comprising: assigning an individual account number and a password to said first and second subscriber.

5. The method of claim 1 further comprising said virtual private network sending an unsecured notification to said second subscriber when said secured message is received.

6. The method of claim 1, further comprising one or more of said subscribers paying a periodic subscription fee to an entity operating said virtual private network.

7. The method of claim 1, said secured message comprising HIPAA restricted information.

8. A method for securely exchanging medical records comprising:

establishing a secure higher level domain with its own URL;

providing a HIPAA compliance officer;

said compliance officer maintaining a security level of said domain sufficient to meet HIPAA requirements;

enrolling a first subscriber and a second subscriber each subscriber having a personal computer interconnected via the internet, each personal computer having a central processor, a display means, a keyboard and a mouse;

providing each of said subscribers with an individual authentication to log onto said domain;

said first and second subscriber logging into said domain;

said first subscriber sending a secured message to said second subscriber via said domain, wherein the message is encrypted; and said second subscriber receives and decrypts said secured message.

9. The method of claim 8, said first subscriber comprising a local area network.

10. The method of claim 8, said second subscriber comprising a local area network.

11. The method of claim 8, said enrollment comprising; assigning an individual account number and a password to said first and second subscriber.

12. The method of claim 8 further comprising said first subscriber sending an unsecured notification message to said second subscriber when said secured message is sent.

13. The method of claim 8 further comprising said domain sending an unsecured notification to said second subscriber when said secured message is received.

14. The method of claim 8 further comprising said domain sending an unsecured notification to said second subscriber when said secured message is sent.

15. The method of claim 8, further comprising one or more of said subscribers paying a periodic subscription fee to an entity operating said virtual private network.

16. The method of claim 8, said secured message comprising HIPAA restricted information.

* * * * *